July 16, 1968

F. E. GRENIER 3,392,654

VEHICLE AIR EXHAUST SYSTEM WITH MAGNETICALLY CONTROLLED VALVE

Filed March 31, 1967

FRANCIS E. GRENIER
INVENTOR.

BY John R. Faulkner
E. Dennis O'Connor

ATTORNEYS

United States Patent Office 3,392,654
Patented July 16, 1968

3,392,654
VEHICLE AIR EXHAUST SYSTEM WITH MAGNETICALLY CONTROLLED VALVE
Francis E. Grenier, Farmington, Mich., assignor to Ford Motor Company, Dearborn, Mich., a corporation of Delaware
Filed Mar. 31, 1967, Ser. No. 627,376
9 Claims. (Cl. 98—2)

ABSTRACT OF THE DISCLOSURE

An air exhaust system for exhausting stale air from a motor vehicle passenger compartment. The stale air is exhausted through a register located in an inner door panel, the door cavity and a magnetically controlled valve located in the free end face of the door. The valve may be partially closed during operation of the vehicle heater to prevent excessive loss of heated air.

Background of the invention

The desirability of a so-called closed window ventilation system for a motor vehicle is well-known as such a system provides fresh air to the interior of the vehicle passenger compartment without the necessity of lowering the windows. The occupants are protected from unwanted road noises as well as wind and dirt while the vehicle interior is ventilated. A closed window ventilation system requires some form of exhaust vent to permit stale air to be exhausted from the passenger compartment in order to permit the entry of high pressure fresh air through the conventional ventilation ducts or vehicle heating system located at the forward extremity of the passenger compartment. Known stale air exhaust means include flap valves operatively connected for air flow with the interior of the vehicle and positioned on the vehicle body exterior in low pressure areas resulting from movement of the vehicle. Such valves, when open, exhaust stale air to the low pressure area adjacent the vehicle body when the fresh air vents are open, thus allowing the entry of high pressure fresh air.

It is known that the space between the free end face of a vehicle door and the door jamb is a low pressure area during the operation of the vehicle. Conventionally, stale air has been exhausted from a vehicle passenger compartment by locating a flap valve over an aperture in the door free end face. This aperture provides communication between the space defined by the door free end face and the door jamb and the internal door cavity. The door cavity is also in communication with the vehicle interior through a register located in the inner panel of the door structure. The door cavity is thus utilized as an exhaust conduit between the passenger compartment and the exterior of the vehicle.

A problem attendant such an arrangement is that the flap valve must be large enough to provide maximum flow through of fresh air during vehicle operation at relatively high ambient temperatures. Such a flap valve, however, deleteriously affects passenger comfort during vehicle operation at relatively low ambient temperatures since the large volume of air extracted causes a heat loss for which conventional vehicle heating systems cannot compensate.

This invention provides an air extractor flap valve for the free end face of a vehicle door assembly that may be variably controlled by electromagnetic means to regulate the volume of air removed from the vehicle passenger compartment depending on the temperature conditions prevalent at the time.

Summary of the invention

The magnetically controlled air extractor valve of this invention is adapted to be utilized in a motor vehicle having a plurality of body structures cooperating to define a passenger compartment, one of the body structures having an air exhaust passageway formed therein communicating between the passenger compartment and the exterior of the vehicle. The valve is secured to the body structure having the air exhaust passageway and controls the air flow through the passageway. The valve includes a closure means having an open position and a closed position, the closure means blocking at least a portion of the passageway in a closed position. A ferromagnetic member is secured to the closure means for movement therewith. Secured to the valve carrying body structure adjacent the closure means is an electromagnetic means which is selectively energizable to produce a magnetic field to attract the ferromagnetic member and thus urge the closure means into the closed position. Control means are provided for selectively energizing the electromagnetic means.

Detailed description of the invention

Figure 1:
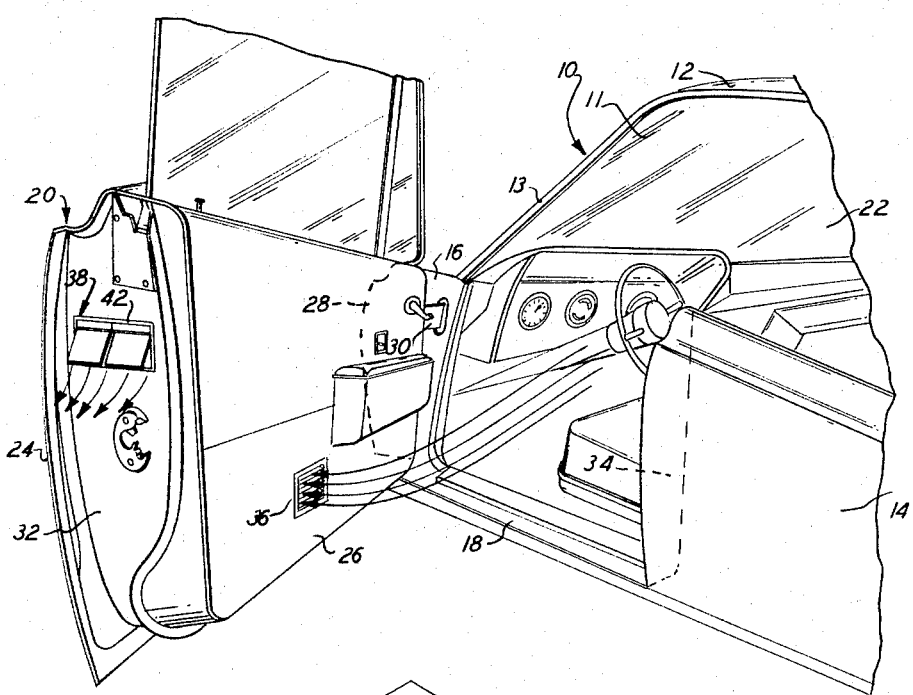
FIGURE 1 is an isometric view of a portion of a motor vehicle having an air exhaust system with a magnetically controlled valve constructed in accordance with this invention.

Referring now in detail to the drawings and in particular to FIGURE 1, the numeral 10 denotes a motor vehicle having a plurality of body members including a roof 12, an A pillar 13, a rear quarter panel 14, a front fender 16 and a rocker panel 18. A door assembly 20 cooperates with the above-mentioned body members to partially define a passenger compartment 22.

Door assembly 20 includes an outer panel 24, an inner panel 26 substantially parallel to the outer panel, a hinge end panel 28 secured by hinge 30 to fender 16 and a free end panel 32 facing a door jamb 34 of quarter panel 14. It is to be understood that although the vehicle 10 illustrated is a two-door model, this invention is equally pertinent for use on a four-door vehicle. Also, it should be noted that hinge end panel 28 and free end panel 32 may be distinct panels or, as is well-known in the art, may be integrally formed as flanges on either outer panel 24 or inner panel 26.

The air exhaust system utilized in vehicle 10 includes a register 36 mounted on inner door panel 26 providing communication between passenger compartment 22 and the interior door cavity defined by outer panel 24, inner panel 26, hinge end panel 28 and free end panel 32. A valve 38 is mounted in an aperture 42 formed in free end panel 32 provides communication between the interior door cavity and the space between free end panel 32 and door jamb 34.

Figure 2:
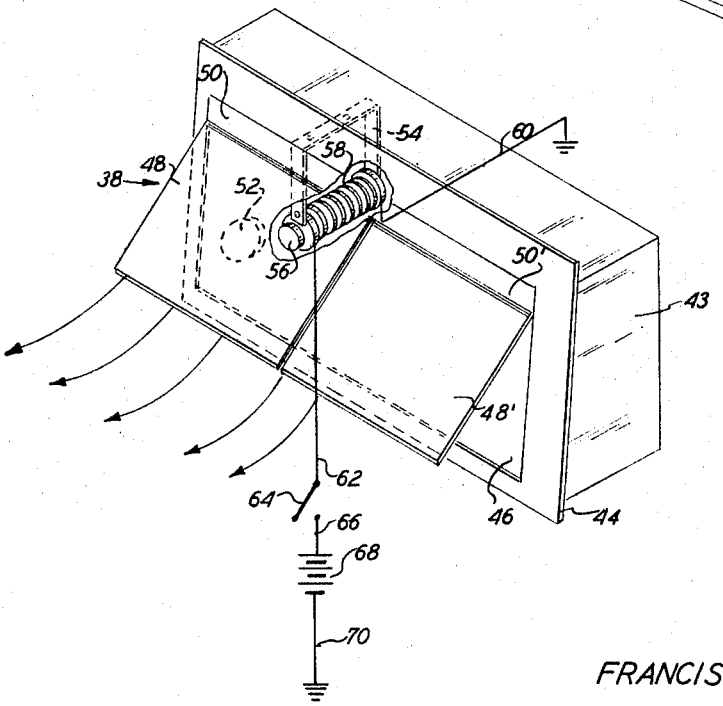
FIGURE 2 is an enlarged isometric view of the magnetically controlled valve of FIGURE 1 having portions broken away to illustrate features of the valve construction and including a schematic representation of the electrical circuit used in conjunction therewith.

The construction of valve 38 may be seen in detail in FIGURE 2. It includes a sleeve-like housing 43 having an integrally formed flange 44 that bears against and is secured to free end panel 32. A central passageway 46 extends through housing 43. A pair of flap valve members 48 and 48' have portions 50 and 50', respectively, secured to flange 44 and are capable of movement from closed positions, wherein each of said flap valve members blocks a portion of passageway 46, and open positions, illustrated in FIGURE 2, permitting the flow of air from the inner door cavity to the exterior of the vehicle. In the preferred and illustrated embodiment of this invention, flap valve members 48 and 48' are formed from one-piece sections of resilient material. It is to be understood, however, that these valve members may be constructed from sheet metal and may be pivotally attached to flange 44 by means of hinges.

A ferromagnetic member 52, that conveniently may be constructed from a disc of iron or nickel, is secured to the inner face of flap valve 48. A bracket 54 is secured to housing 43 in a manner such that it supports a core 56 of ferromagnetic material in a location so that core 56 registers with ferromagnetic member 52 when flap valve 48 is in a closed position. A coil 58 of electrically conductive wire surrounds core 56 and has one end thereof connected by conductor 60 to ground. The other end of coil 58 is connected by a conductor 62 to a switch 64. A conductor 66 electrically connects switch 64 to a source of electrical energy such as battery 68 which, in turn, is connected by a conductor 70 to ground.

The operation of the vehicle exhaust system described above is as follows:

When it is desired, during the operation of motor vehicle 10, to ventilate passenger compartment 22, the vehicle operator opens front air vents that admit high pressure fresh air to the interior of the vehicle. (Such vents are well-known in the art and constitute no part of the present invention.) It is well-known that the space between free end face 32 of door assembly 20 and door jamb 34 is an area of low pressure. Thus, stale air present within the vehicle passenger compartment 22 flows into the door cavity through register 36 and exits the door cavity via passageway 46 of valve 38. The cross sectional area of valve passageway 46 is sufficiently large so that the volume of air passing therethrough enables passenger compartment 22 to be ventilated sufficiently for passenger comfort. At this time, both valve members 48 and 48' are forced open by the flow of air through passageway 46 and switch 64 is in the open position as illustrated in FIGURE 2.

During periods of cold ambient temperatures when the vehicle heating system is in operation, ventilation of the interior of the vehicle to remove stale air also is necessary. Since the heated air forced into passenger compartment 22 by the heater system is at high pressure, if both valve members 48 and 48' are open at this time, the heat loss occasioned by warm air being exhausted through passageway 46 would be sufficiently large to impair passenger comfort within passenger compartment 22 despite the operation of the vehicle heating system. Whenever the heating system of the vehicle is operating, therefore, switch 64 is closed. (Switch 64 may be connected by mechanical coupling means to the heater control so that upon activation of the heater system switch 64 is automatically closed, or switch 64 may be operated manually by the vehicle operator.) Closing switch 64 completes a circuit from battery 68 to coil 58. Ferromagnetic core 56 becomes magnetized creating a magnetic field that attracts ferromagnetic member 52, thus exerting a force urging valve member 48 into the closed position blocking a portion of passageway 46. Exhausted air thus may flow only through the portion of passageway 46 corresponding to the cross sectional area of valve member 48'. This cross sectional area is sufficient to permit restricted ventilation of passenger compartment 22 but the heat loss through this portion of passageway 46 does not impair the heating function of the vehicle heating system.

It may thus be seen that this invention provides a vehicle air exhaust system including a magnetically controlled valve capable of regulating the volume of exhausted air so that large volumes of air may be removed from the vehicle passenger compartment during periods of high ambient temperature while a restricted volume of air is removed during periods of heater operation.

It is to be understood that this invention is not limited to the exact construction shown and described above, but that various changes and modifications may be made without departing from the spirit and scope of the invention as defined by the following claims.

I claim:

1. In a motor vehicle, body structures cooperating to define a passenger compartment, one of said body structures having an air exhaust passageway formed therein communicating between said compartment and the exterior of the vehicle, the improvement comprising: valve means operatively secured to said one body structure and controlling the flow of air through said passageway, said valve means including a closure member having an open position and a closed position, said closure member blocking at least a portion of said passageway in the closed position, a ferromagnetic member secured to said closure member for movement therewith, selectively energizable electromagnetic means for producing a magnetic field attracting said ferromagnetic member and urging said closure member into the closed position, and control means for selectively energizing said electromagnetic means.

2. The combination of claim 1, wherein said electromagnetic means comprise a ferromagnetic core, an electrically conductive coil surrounding said core and a source of electrical energy in series circuit with said coil, said control means comprising a switch in series between said coil and said source of electrical energy.

3. The combination of claim 1, wherein said closure member comprises a resilient flap valve member having its open position exteriorly of said one body structure and preventing the flow of air from the exterior of said vehicle to said compartment.

4. The combination of claim 1, wherein said closure member blocks a first portion of said aperture in the closed position, and further including a second closure member comprising a flap valve member having an open position and a closed position, said flap valve member blocking a second portion of said passageway in the closed position.

5. The combination of claim 1, wherein said one body member comprises a door assembly having a central cavity, a register communicating between said cavity and said passenger compartment, and an aperture communicating between said cavity and the exterior of the vehicle, said passageway including said register, said cavity and said aperture.

6. In a motor vehicle body having a door partially defining a passenger compartment, said door having spaced, generally parallel inner and outer panels, a hinge end panel and a free end panel, said end panels joining and cooperating with said inner and outer panels to define a door cavity, the improvement comprising: an air exhaust system including register means in said inner panel communicating between said cavity and said compartment, said free end panel having an aperture therein, valve means operatively secured to said free end panel for movement relative thereto and controlling the flow of air through said aperture, said valve means having an open position and a closed position, ferromagnetic means secured to said valve means for movement therewith, and electromagnetic means operatively secured to said free end face within said cavity for producing a magnetic field attracting said ferromagnetic means and urging said valve means into the closed position.

7. The combination of claim 6, wherein said electromagnetic means comprise a ferromagnetic core and an electrically conductive coil surrounding said core and in series circuit with a switch, said switch in series circuit with a source of electrical energy.

8. The combination of claim 6, wherein said valve means blocks a first portion of said aperture in the closed position, and further including a second valve means having an open position and a closed position, said second valve means blocking a second portion of said aperture in the closed position.

9. The combination of claim 8, wherein both of said valve means comprise flap valves having said open positions exterior of said door cavity, thereby preventing the flow of air from exterior of said vehicle into said cavity.

References Cited

UNITED STATES PATENTS

| | | | |
|---|---|---|---|
| 2,436,728 | 2/1948 | Parsons | 98—2 |
| 2,573,419 | 10/1951 | Emery | 98—2 |
| 3,330,199 | 7/1967 | Campbell | 98—2 |

MEYER PERLIN, *Primary Examiner.*